United States Patent
Gaiser et al.

(10) Patent No.: US 10,502,111 B2
(45) Date of Patent: Dec. 10, 2019

(54) EXHAUST SYSTEM FOR AN INTERNAL COMBUSTION ENGINE AND METHOD FOR OPERATING AN EXHAUST SYSTEM

(71) Applicant: Eberspächer Exhaust Technology GmbH & Co. KG, Neunkirchen (DE)

(72) Inventors: Gerd Gaiser, Reutlingen (DE); Fabian Frobenius, Esslingen (DE); Bernd Weller, Durlangen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 15/402,601

(22) Filed: Jan. 10, 2017

(65) Prior Publication Data
US 2017/0198621 A1 Jul. 13, 2017

(30) Foreign Application Priority Data
Jan. 11, 2016 (DE) .................. 10 2016 100 284

(51) Int. Cl.
*F01N 3/20* (2006.01)
*F01N 5/02* (2006.01)
*F01N 3/02* (2006.01)

(52) U.S. Cl.
CPC ......... *F01N 3/2066* (2013.01); *F01N 3/0205* (2013.01); *F01N 3/208* (2013.01); *F01N 3/2026* (2013.01); *F01N 5/02* (2013.01); *F01N 2610/02* (2013.01); *F01N 2610/10* (2013.01); *F01N 2610/105* (2013.01); *F01N 2610/107* (2013.01); *F01N 2610/14* (2013.01); *F01N 2610/144* (2013.01); *F01N 2610/146* (2013.01); *F01N 2610/1453* (2013.01);
(Continued)

(58) Field of Classification Search
CPC ............ F01N 2610/02; F01N 2610/10; F01N 2610/1453; F01N 3/2066; F01N 3/2026; F01N 3/208
USPC .................................. 60/286, 298, 301, 303
See application file for complete search history.

(56) References Cited

U.S. PATENT DOCUMENTS 4,023,360 A * 5/1977 Wossner ................ F01N 3/05
422/171
4,140,173 A * 2/1979 Wulf ...................... B60H 1/20
165/10
(Continued)

FOREIGN PATENT DOCUMENTS

CN 101828011 A 9/2010
CN 102472142 A 5/2012
(Continued)

*Primary Examiner* — Audrey K Bradley
*Assistant Examiner* — Diem T Tran
(74) *Attorney, Agent, or Firm* — McGlew and Tuttle, P.C.

(57) ABSTRACT

An exhaust system for an internal combustion engine, especially for a vehicle, includes an exhaust gas-carrying pipe (12) and a reactant release unit (14) for releasing reactant (R) into exhaust gas (A) flowing in the exhaust gas-carrying pipe (12). The reactant release unit (14) includes a reactant injection unit (20), a reactant delivery unit (18) delivering reactant (R) from a reactant reservoir to the reactant injection unit (20) and a heating unit (24) for heating reactant (R) being delivered to the reactant injection unit (20). The heating unit (24) includes an exhaust gas/reactant heat exchanger unit (26) for transferring heat, being transported in the exhaust gas (A), to the reactant (R).

9 Claims, 5 Drawing Sheets

(52) U.S. Cl.
CPC .............. *F01N 2900/1808* (2013.01); *F01N 2900/1811* (2013.01); *Y02A 50/2325* (2018.01); *Y02T 10/16* (2013.01); *Y02T 10/24* (2013.01)

(56) References Cited

U.S. PATENT DOCUMENTS

| | | |
|---|---|---|
| 6,361,754 B1 | 3/2002 | Peter-Hoblyn et al. |
| 2003/0221413 A1 | 12/2003 | Buglass et al. |
| 2007/0110642 A1* | 5/2007 | Hirata ................. F01N 3/2066 422/168 |
| 2008/0314027 A1* | 12/2008 | Barber ................. B01D 53/90 60/286 |
| 2009/0107116 A1 | 4/2009 | Barber et al. |
| 2009/0120079 A1 | 5/2009 | Buckberry et al. |
| 2010/0242439 A1 | 9/2010 | Domon et al. |
| 2012/0087840 A1 | 4/2012 | Hirschberg |
| 2013/0118155 A1* | 5/2013 | Domon ................. F01N 3/10 60/274 |

FOREIGN PATENT DOCUMENTS

| | | |
|---|---|---|
| DE | 69207854 T2 | 6/1996 |
| DE | 102006049591 A1 | 5/2007 |
| DE | 102006057151 A1 | 6/2008 |
| DE | 102009016097 A1 | 10/2010 |
| JP | 62268722 * | 11/1987 |
| JP | H06 272539 A | 9/1994 |
| JP | 2004-132286 * | 4/2004 |
| JP | 2004 132286 A | 4/2004 |
| WO | 2006/087553 A1 | 8/2006 |
| WO | 2008/066482 A1 | 6/2008 |
| WO | 2011/000685 A1 | 1/2011 |

* cited by examiner

EXHAUST SYSTEM FOR AN INTERNAL COMBUSTION ENGINE AND METHOD FOR OPERATING AN EXHAUST SYSTEM

CROSS REFERENCE TO RELATED APPLICATIONS

This application claims the benefit of priority under 35 U.S.C. § 119 of German Application DE 10 2016 100 284.4 filed Jan. 11, 2016, the entire contents of which are incorporated herein by reference.

FIELD OF THE INVENTION

The present invention pertains to an exhaust system for an internal combustion engine, especially for a vehicle, comprising an exhaust gas-carrying pipe and a reactant release unit for releasing reactant into exhaust gas flowing in the exhaust gas-carrying pipe, wherein the reactant release unit comprises a reactant injection unit, a reactant delivery unit delivering reactant from a reactant reservoir to the reactant injection unit and a heating unit for heating reactant being delivered to the reactant injection unit. The present invention further pertains to a method for operating an exhaust system having such a configuration especially during the operation of an internal combustion engine connected to this exhaust system.

BACKGROUND OF THE INVENTION

An exhaust system according to the preamble of claim 1 is known from DE 10 2006 049 591 A1. Urea or a urea/water solution is fed as a reactant into the exhaust gas flowing in an exhaust gas-carrying pipe in this prior-art exhaust system. A selective catalytic reduction, during which nitrogen oxides are reacted into nitrogen, takes place with the urea/water mixture mixed with the exhaust gas in the area of a catalytic converter device provided in the exhaust system or in the exhaust gas-carrying pipe.

To improve the mixing of the urea/water mixture with the exhaust gas, the urea/water mixture is brought into a superheated state prior to being released into the exhaust gas in this prior-art exhaust system. This prior-art exhaust system has for this purpose a heating unit with an electrically operable heater, which raises the temperature of the urea/water mixture to a superheated temperature. To prevent the urea/water mixture from evaporation already before its release into the exhaust gas, the pressure of this mixture is raised by a pump delivering the urea/water mixture to a pressure above the vapor pressure prevailing in association with the superheated temperature. When releasing the initially superheated urea/water mixture, which is maintained in a liquid state, into the exhaust gas, this urea/water mixture decompresses spontaneously, so that this mixture with partially evaporate, on the one hand, and very fine liquid particles will be generated, on the other hand, and very good mixing of the reactant mixed with the exhaust gas is achieved.

SUMMARY OF THE INVENTION

An object of the present invention is to provide an exhaust system for an internal combustion engine, especially for a vehicle, as well as a method for operating such an exhaust system, with which exhaust system and method the heating of the reactant can be achieved with the use of a reduced amount of energy.

This object is accomplished according to the present invention by an exhaust system for an internal combustion engine, especially for a vehicle, comprising an exhaust gas-carrying pipe and a reactant release unit for releasing reactant into exhaust gas flowing in the exhaust gas-carrying pipe, wherein the reactant release unit comprises a reactant injection unit, a reactant delivery unit delivering reactant from a reactant reservoir to the reactant injection unit, and a heating unit for heating reactant being delivered to the reactant injection unit.

Provisions are made according to the invention for the heating unit to comprise an exhaust gas/reactant heat exchanger unit for transferring heat being transported in the exhaust gas to the reactant.

The exhaust system according to the present invention utilizes the heat being transported in the combustion waste gas of an internal combustion engine to heat the reactant to be injected into the exhaust gas, especially to bring it into a superheated state, in order to thus achieve the above-described effect of spontaneous evaporation of the reactant during the release of the reactant into the exhaust gas. As the exhaust gas flowing in the exhaust gas-carrying pipe has a very high temperature, the exhaust system according to the present invention may be operated and configured in principle, such that no additional electricity is necessary for heating the reactant to the superheated temperature. This appreciably reduces the load on the on-board electrical system in a vehicle, because the heating output, which is necessary for superheating the reactant may be in the range of up to 1.5 kW, especially in utility vehicles.

It is proposed, in a configuration that can be embodied in an especially simple manner, that the exhaust gas/reactant heat exchanger unit comprise a heat exchanger line area in a reactant line carrying reactant to the reactant injection unit.

Highly efficient heat transfer can be guaranteed here by the heat exchanger line area extending, in at least some sections, preferably essentially completely in the interior of the exhaust gas-carrying pipe.

An increase in the interaction length that can be utilized for the heat transfer can be achieved by the heat exchanger line area extending in the interior of the exhaust gas-carrying pipe in a winding-like manner, preferably in a helical or/and spiral or/and meandering manner.

To prevent the exhaust gas flow from being compromised by the heat exchanger line area extending in the interior of the exhaust gas-carrying pipe, it is proposed that the heat exchanger line area extend close to an inner surface or/and in contact with an inner surface of the exhaust gas-carrying pipe. To improve the heat transfer from the exhaust gas to the reactant flowing in the heat exchanger line area even more, it is proposed that at least one heat transfer rib and preferably a plurality of heat transfer ribs be provided in the heat exchanger line area, preferably heat transfer surfaces located essentially parallel to an exhaust gas flow direction. The exhaust gas flow is not compromised especially if the heat transfer surfaces of such heat transfer ribs are directed essentially parallel to the exhaust gas flow direction in the area of the heat exchanger line area.

In an alternative embodiment of the exhaust system according to the present invention, which may also be combined with the above-described embodiment, it is proposed that the heat exchanger line area extend, in at least some sections, preferably essentially completely outside the exhaust gas-carrying pipe. Such an arrangement is especially advantageous if design specifications make it impossible to provide additional components in the interior of an exhaust gas-carrying pipe.

To guarantee efficient heat transfer even in case of such a positioning of the heat exchanger line area outside the exhaust gas-carrying pipe, it is proposed that the heat exchanger line area extend close to an outer surface or/and on an outer surface of the exhaust gas-carrying pipe, preferably surrounding same in a helical or/and meandering manner.

To avoid heat losses to the outside, especially in the area in which the heat exchanger line area interacts with the exhaust gas-carrying pipe for heat transfer, it is proposed that the exhaust gas-carrying pipe be surrounded, in at least some sections, by an insulating material at least in its length area interacting with the heat exchanger line area.

It is proposed, especially in cases in which sufficient heating of the reactant to the superheated temperature cannot be guaranteed, for example, because comparatively large quantities of reactant are to be injected, that the heating unit comprise an electrically operable heater.

The heater may advantageously be arranged upstream in relation to the heat exchanger line area in the flow direction, so that, for example, the reactant is first preheated in the heater by electrically energizing said heater, and it will then assume the superheated state during its flow through the heat exchanger line area.

It is proposed in an alternative embodiment that the heater be arranged upstream in relation to the heat exchanger line area in the direction of flow of the reactant. The reactant is first preheated in this unit by thermal interaction with the exhaust gas, and the amount of heat still necessary for superheating the reactant is then provided by correspondingly energizing the heater.

The reactant delivery unit is preferably arranged upstream of the heating unit in the direction of flow of the reactant, so that it can be guaranteed that the reactant pressure exceeding the vapor pressure of the superheated reactant can be generated and also maintained by the reactant delivery unit, so that there is no risk reactant evaporation in the area of the heating unit.

The exhaust system according to the present invention advantageously comprises an actuating unit for actuating the reactant delivery unit or/and, if present, an electrically operable heater of the heating unit.

At least one reactant pressure sensor may be provided in the flow path of the reactant between the reactant delivery unit and the reactant injection unit. The actuating unit may be configured to actuate the reactant delivery unit or/and the electrically operable heater of the heating unit or/and the reactant injection unit based on a reactant pressure detected by the reactant pressure sensor. It becomes possible due to the detection of the reactant pressure to carry out a pressure regulation, so that it is guaranteed that the pressure of the reactant is above the vapor pressure of the reactant preferably brought into a superheated state especially also in the area of the heating unit.

As an alternative or in addition, provisions may be made for at least one reactant temperature sensor to be provided in the flow path of the reactant between the heating unit and the reactant injection unit and for the actuating unit to be configured to actuate the reactant delivery unit or/and an electrically operable heater of the heating unit or/and the reactant injection unit based on a reactant temperature detected by the reactant temperature sensor. The detection of the reactant temperature makes it possible, on the one hand, to ensure that this temperature is, for example, in the range of a desired superheated temperature. On the other hand, the corresponding vapor pressure can be determined by detecting the temperature on the basis of corresponding data stored, for example, in the actuating unit, and the reactant delivery unit can be actuated such that the reactant pressure generated by this is above this vapor pressure.

The present invention further pertains to a method for operating an exhaust system configured according to the present invention, in which method the actuating unit actuates the reactant delivery unit such that the reactant pressure is above the vapor pressure of the reactant being heated by the heating unit.

Further, the electrically operable heater is preferably actuated by the actuating unit such that the reactant being heated by the heating unit is brought into a superheated state, preferably such that the reactant temperature is in the range of a desired superheated temperature.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
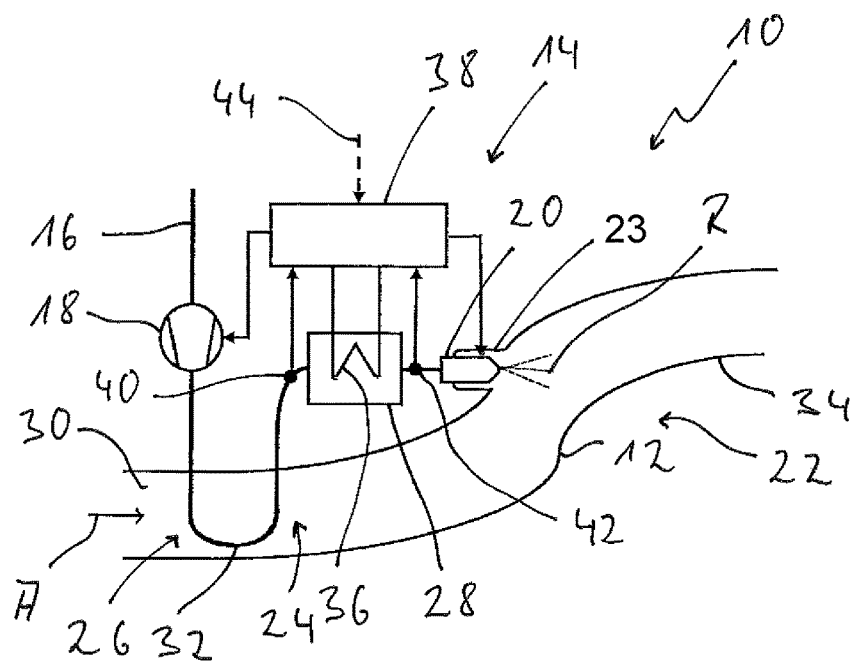
FIG. 1 is a general view of an exhaust system with an exhaust gas-carrying pipe and with a reactant release unit.

Referring to the drawings, an exhaust system, for example, for an internal combustion engine of a vehicle, is generally designated by 10 in FIG. 1. The exhaust system 10 comprises an exhaust gas-carrying pipe 12, which carries the exhaust gas A being discharged from an internal combustion engine in the direction of a catalytic converter unit.

A reactant release unit 14 comprises a reactant line 16, via which reactant R, for example, a urea/water solution or another reducing agent, e.g., denoxium or isocyanic acid, is delivered from a reactant reservoir, not shown, by means of a reactant delivery unit 18 arranged in the reactant line 16 to a reactant injection unit 20, which is generally also called injector. The reactant injection unit 20 is arranged in the example shown in FIG. 1 in an insert branch 23 branching off from the exhaust gas-carrying pipe 12 in a curvature area 22 thereof in the example shown in FIG. 1, so that the reactant R injected by the reactant injection unit 20 into the exhaust gas is introduced into this area essentially in the direction of flow of the exhaust gas A.

The reactant release unit 14 further comprises a heating unit generally designated 24. In the exemplary embodiment shown in FIG. 1, the heating unit 24 comprises an exhaust gas/reactant heat exchanger unit 26 and an electrically operable heater 28. In the exemplary embodiment shown in FIG. 1, the exhaust gas/reactant heat exchanger unit 26 is arranged in the flow path upstream in relation to the heater 28 between the exhaust gas delivery unit 18, for example, pump, and the reactant injection unit 20.

The exhaust gas/reactant heat exchanger unit 26 comprises a heat exchanger line area 32 of the reactant line 16, which area extends in the interior 30 of the exhaust gas-carrying pipe 12. In the exemplary embodiment shown in FIG. 1, the heat exchanger line area 32 passes through the wall 34 of the exhaust gas-carrying pipe 12, extends in an arc-shaped manner in the interior 30 of the exhaust gas-carrying pipe 12 and then passes again through the wall 34 of the exhaust gas-carrying pipe to lead to the heater 28.

The heater 28 may comprise a line area in which, for example, a heat conductor 36 that can be heated by energization with electricity, is arranged and around which the reactant flows. As an alternative or in addition, such a heat conductor may be arranged such that it surrounds an area of the reactant line 16 on the outside in order to transfer heat to the liquid reactant being guided in the reactant line 16.

To make it possible to operate the exhaust system 10, an actuating unit generally designated by 38 is provided. The actuating device 38 is in an actuating connection with the reactant delivery unit 18, with the reactant injection unit 20 and with the heater 28 and can actuate or energize these for carrying out the required operation. The actuating unit 38 receives the output signal from a pressure sensor 40, which is arranged in the example being shown upstream in relation to the heater 28 and downstream in relation to the reactant delivery unit 18 and also to the exhaust gas/reactant heat exchanger unit 26 and thus detects the reactant pressure in an area between the reactant delivery unit 18 and the reactant injection unit 20.

Further, the output signal of a temperature sensor 42, which is arranged in the example being shown downstream in relation to the heater 28 and hence in relation to the entire heating unit 24 and upstream in relation to the reactant injection unit 20 of the reactant release unit 14, is sent to the actuating unit 38. The temperature sensor 42 can thus detect the temperature of the reactant R heated by the heating unit 24 immediately before release by the reactant injection unit 20.

The actuating unit 38 actuates the heater 28, especially when taking into account the reactant temperature detected by the temperature sensor 42, such that the temperature of the reactant R to be released by the reactant injection unit 20 is a superheated temperature, preferably in the range of a desired superheated temperature. To guarantee that the reactant R does not evaporate already before being released into the exhaust gas-carrying pipe 12, i.e., upstream of the reactant injection unit 20, the actuating unit 38 also actuates the reactant delivery unit 18 such that the reactant pressure detected by the pressure sensor 40 is taken into account, such that this reactant pressure is above the vapor pressure existing in conjunction with the superheated temperature that is present or is to be set. For example, the actuation of the reactant delivery unit 18 may be such that there is a predefined minimum distance between the vapor pressure and the reactant pressure detected by the pressure sensor 40.

By taking into account the reactant temperature, on the one hand, and the reactant pressure, on the other hand, very fine regulation of the temperature and pressure of the reactant can take place, so that both variables can also be maintained during the release of reactant R into the exhaust gas at or close to a respective desired value preset for this.

The actuating unit 38 may further receive information relevant for the operation of the reactant release unit 14, for example, via a CAN bus 44. This information may comprise, for example, information on the exhaust gas mass flow, the exhaust gas temperature or the load point of the internal combustion engine discharging the exhaust gas. Based on this information, the actuating unit 38 can actuate especially the reactant injection unit 20 such that the suitable quantity of reactant R is injected in association with the quantity of exhaust gas flowing through the exhaust gas-carrying pipe 12. The actuating unit 38 can also actuate the heater 28 by taking into account this quantity of reactant R to be released via the reactant injection unit 20 such that it is guaranteed that the reactant R to be released will have the desired temperature. The exhaust gas temperature and the exhaust gas mass flow can, in particular, also be taken into account in a regulation algorithm, of the actuating unit 38, because these variables are also decisive for the amount of heat introduced via the exhaust gas/reactant heat exchanger unit 26.

With the system shown in FIG. 1, in which the heating unit 24 comprises the exhaust gas/reactant heat exchanger unit 26, on the one hand, and the heater 28, on the other hand, these two system areas are advantageously configured such that taking the exhaust gas temperature to be expected and the exhaust gas mass flow to be expected into account, the reactant R is heated only partially in the area of the exhaust gas/reactant heat exchanger unit 26, but the desired temperature or the desired superheated temperature can only be reached by the additional operation of the heater 28. It thus becomes possible to carry out a temperature regulation in which the desired temperature is prevented from being exceeded in a non-regulatable manner. In particular, the interaction length of the heat exchanger line area 32 is dimensioned for this such that the introduction of energy that is necessary for such preheating can be introduced into the reactant only there. In particular, it can also be guaranteed in this manner that unavoidable temperature variations of the exhaust gas can be compensated by corresponding actuation of the heater 28.

With reference to FIGS. 2 through 10, alternative embodiments of such an exhaust system will be described below. Components that correspond to above-described components in terms of configuration and function are designated by the same reference numbers. The differences existing from the above-described embodiment or embodiments will essentially be discussed below.

Figure 2:
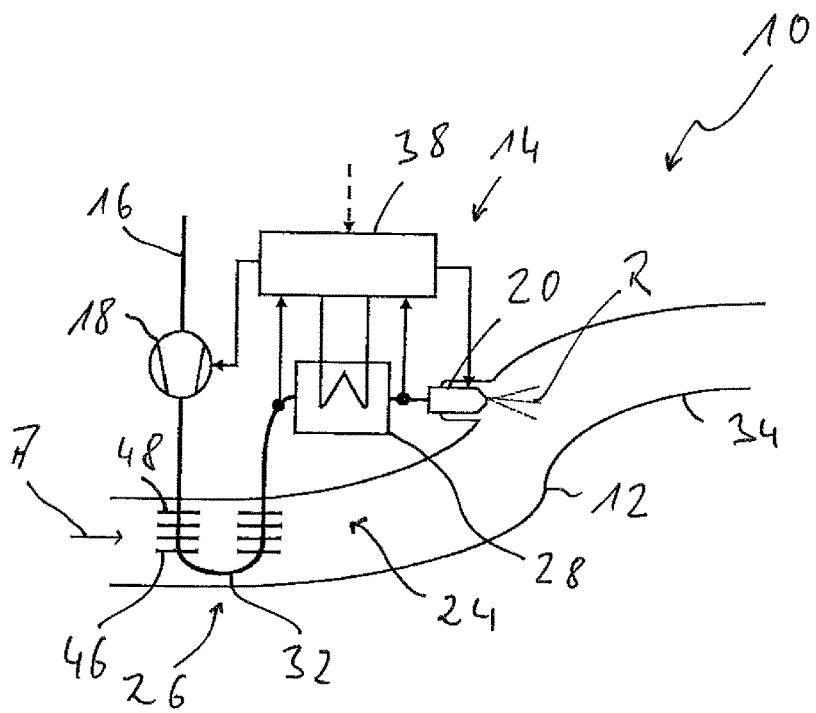
FIG. 2 is a view corresponding to FIG. 1 of an alternative embodiment of an exhaust system.

The exhaust system shown in FIG. 2 has a plurality of heat transfer ribs 46 arranged essentially parallel to one another in the area of the heat exchanger line area 32. These heat transfer ribs, which have a plate-shaped configuration and the heat exchanger line area 32 passed through them, enlarge the surface of the exhaust gas/reactant heat exchanger unit 26 available for the thermal interaction due to their heat transfer surfaces 48, which are essentially parallel to the direction of flow of the exhaust gas A in this area, so that the thermal energy being transported in the exhaust gas A can be utilized more efficiently.

Figure 3:
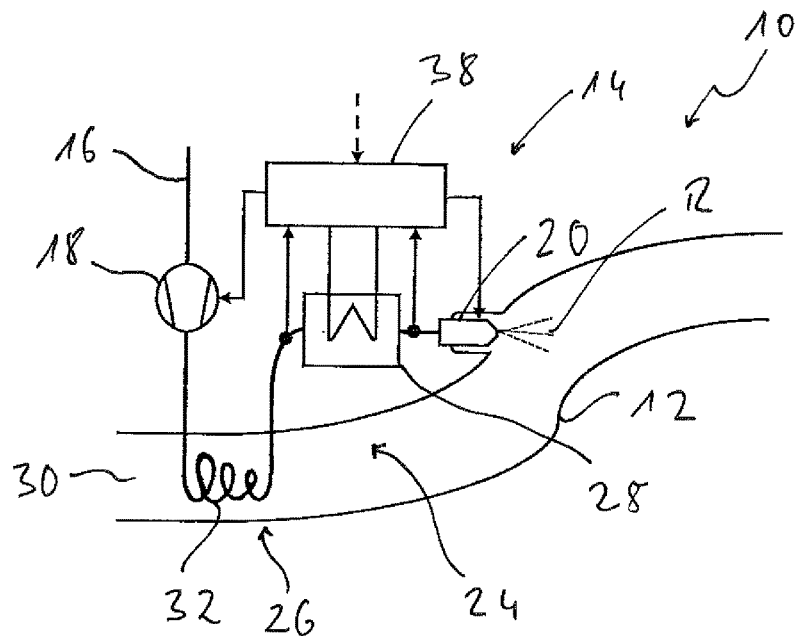
FIG. 3 is a view corresponding to FIG. 1 of an alternative embodiment of an exhaust system.

In the exemplary embodiment shown in FIG. 3, the heat exchanger line area 32 extends in a winding-like manner in the area 30 of the exhaust gas-carrying pipe 12. The heat exchanger line area 32 has a helically or also spirally winding configuration in the example being shown, so that a larger interaction length of the heat exchanger line area 32 can be provided relative to a predefined length area of the exhaust gas-carrying pipe. It should be noted that other geometries, for example, a meander-like unit of the heat exchanger line area, may also be provided as well.

Figure 4:
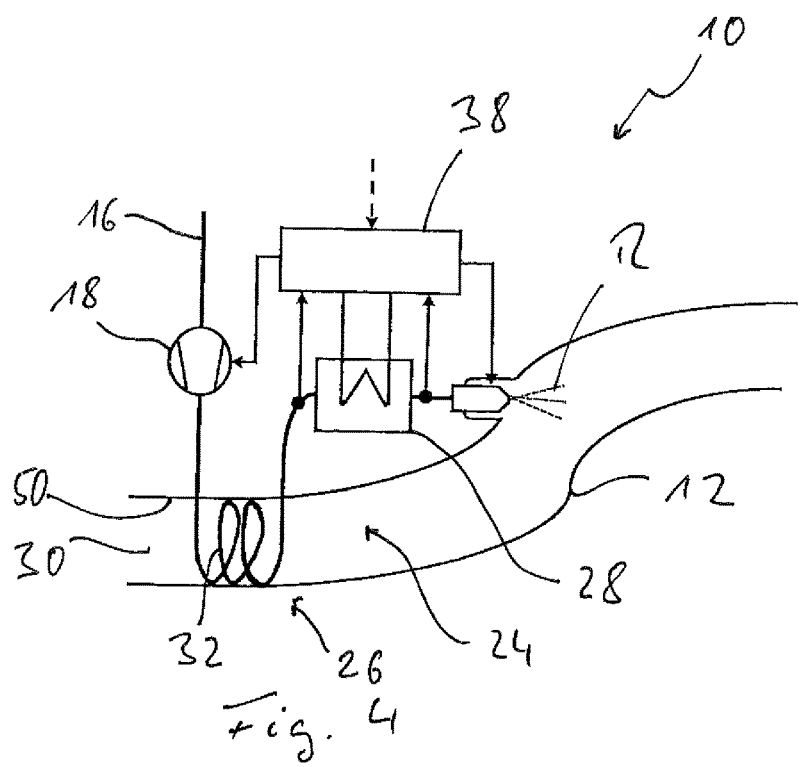
FIG. 4 is a view corresponding to FIG. 1 of an alternative embodiment of an exhaust system.

While the heat exchanger line area 32 extending in a winding-like manner in the exemplary embodiment shown in FIG. 3 is arranged essentially in the middle area of the exhaust gas-carrying pipe 12 relative to the cross-sectional area thereof, the heat exchanger line area 32, wound preferably in a helical manner with a plurality of windings, is positioned in the exemplary embodiment shown in FIG. 4 such that it is in contact with an inner surface 50 of the exhaust gas-carrying pipe 12. The exhaust gas flowing in the exhaust gas-carrying pipe 12 can thus flow through this pipe without the flow through the heat exchanger line area 32 being substantially hindered, because especially the central cross-sectional area of the exhaust gas-carrying pipe 12 is kept free and thus there is a lower flow resistance and hence a lower pressure loss.

Figure 5:
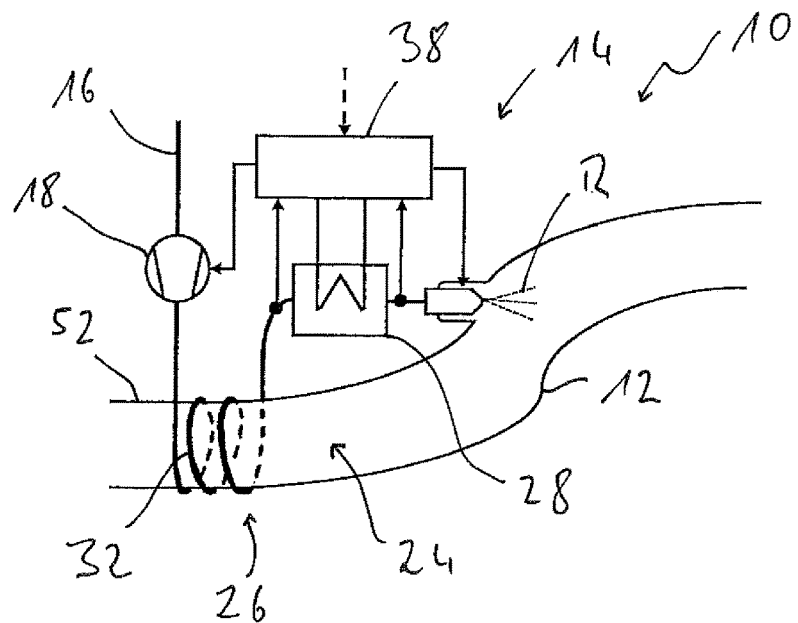
FIG. 5 is a view corresponding to FIG. 1 of an alternative embodiment of an exhaust system.
Figure 6:
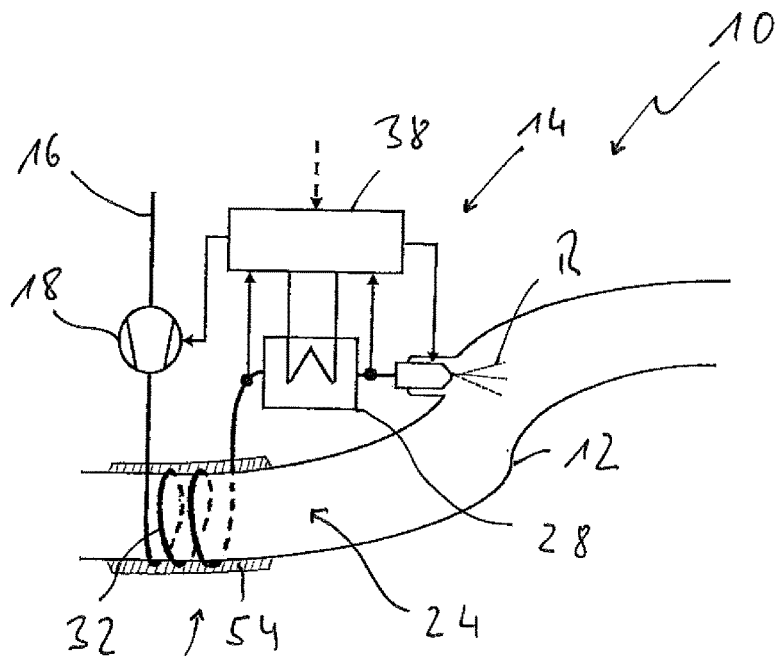
FIG. 6 is a view corresponding to FIG. 1 of an alternative embodiment of an exhaust system.

FIG. 5 shows an embodiment, in which the heat exchanger line area 32 extending in a winding-like manner is positioned such that it is preferably in contact with an outer surface 52 of the exhaust gas-carrying pipe 12 outside said exhaust gas-carrying pipe 12. The flow in the interior 30 of the exhaust gas-carrying pipe 12 is thus completely prevented from being compromised. Good heat transfer is nevertheless guaranteed due to the direct contact of the heat exchanger line area 32 with the outer surface 52 of the exhaust gas-carrying pipe 12. Such an embodiment is especially advantageous in utility vehicles, in which the exhaust gas-carrying pipe 12 is surrounded by a so-called exhaust gas box and there also is a comparatively high ambient temperature outside the exhaust gas-carrying pipe 12.

It should be noted that the heat exchanger line area 32 may be arranged in contact with the outer surface 52 of the exhaust gas-carrying pipe 12 wound in another manner, for example, in a meandering manner, in this embodiment of the heat exchanger line area 32 as well.

To reduce or avoid heat losses to the outside in the area in which the exhaust gas/reactant heat exchanger unit 26 interacts with the exhaust gas-carrying pipe 12, the exhaust gas-carrying pipe 12 may be surrounded in this length area by an insulating material 54, for example, foamed material or insulating mat material, which also embeds the heat exchanger line area 32. This arrangement is especially advantageous where the exhaust gas-carrying pipe 12 is positioned exposed on the outside on a vehicle and a great heat loss to the outside is to be expected above all in case of comparatively low ambient temperatures.

Figure 7:
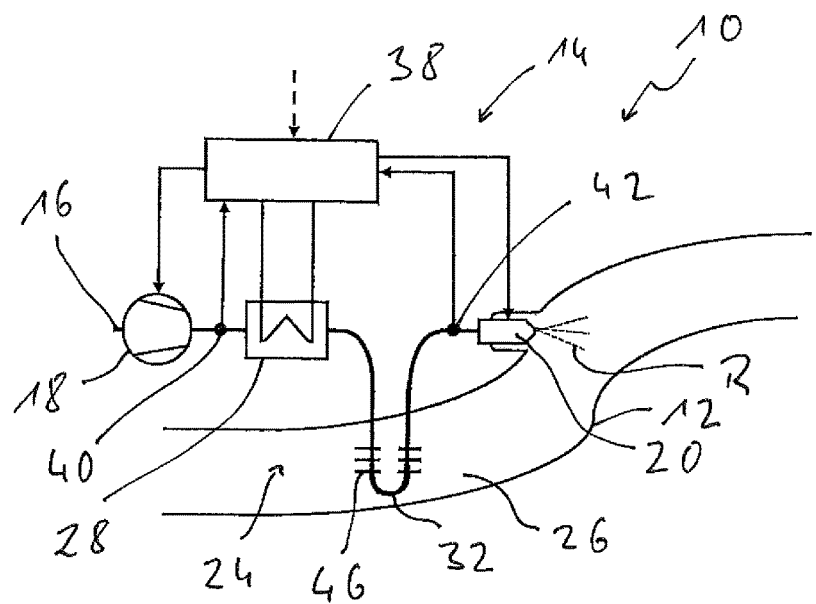
FIG. 7 is a view corresponding to FIG. 1 of an alternative embodiment of an exhaust system.

The electrically operated heater 28 is always positioned downstream in relation to the exhaust gas/reactant heat exchanger unit in the embodiments of an exhaust system described above with reference to FIGS. 1 through 6. By contrast, FIG. 7 shows an embodiment in which the heater 28 is arranged upstream of the exhaust gas/reactant heat exchanger unit 26, so that the reactant to be released via the injection unit 20 of the reactant release unit 14 is first preheated by the heater 28 and is then still heated additionally during its flow through the heat exchanger line area 32. Very fine temperature regulation can also take place in this embodiment by a corresponding actuation of the heater 28 to set the reactant temperature detected by the temperature sensor 42 at the desired temperature.

It should be noted that the exhaust gas/reactant heat exchanger unit 26 may also be configured in the embodiment shown in FIG. 7 in the same manner as in one of the above-described embodiments.

Figure 8:
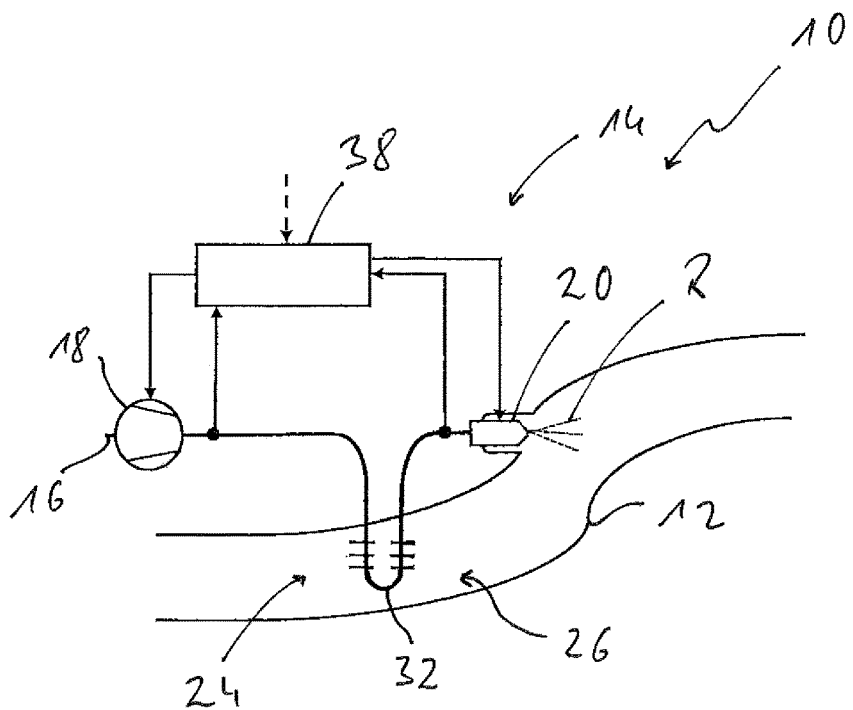
FIG. 8 is a view corresponding to FIG. 1 of an alternative embodiment of an exhaust system.

FIG. 8 shows an embodiment of an exhaust system, in which the heating unit 24 comprises only the exhaust gas/reactant heat exchanger unit 26, but no electrically operable heater. This means that the temperature of the reactant R to be released via the reactant injection unit 20 cannot essentially be regulated in the embodiment shown in FIG. 8. The exhaust gas/reactant heat exchanger unit 26 is rather advantageously dimensioned and configured in this embodiment such that the heating of the reactant to be released to the desired temperature, especially to a superheated temperature, can be guaranteed by sufficient thermal interaction with the exhaust gas in the exhaust gas-carrying pipe 12.

The temperature of the reactant can be detected by the temperature sensor 42 in this embodiment as well, so that if the pressure signal sent by the pressure sensor 40 is also taken into account, the reactant delivery unit 18 can be actuated such that the reactant pressure is above the vapor pressure of the reactant advantageously heated to a superheated temperature in the heating unit 24 in the area of the reactant line 16 between the reactant delivery unit 18 and the injection unit 20 of the reactant release unit 14.

Figure 9:
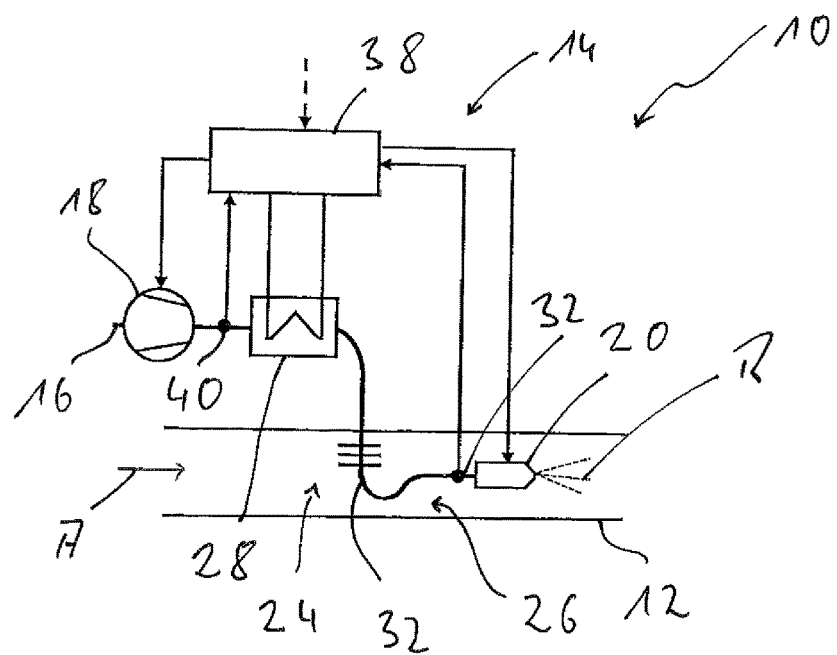
FIG. 9 is a view corresponding to FIG. 1 of an alternative embodiment of an exhaust system.

FIG. 9 shows an exhaust system 10, in which the reactant R is released into an area of the exhaust gas-carrying pipe 12, which area extends, for example, essentially straight. The injection unit 20 of the reactant release unit 14 may be arranged for this purpose, for example, in the cross-sectional area of the exhaust gas-carrying pipe 12 adjoining the heat exchanger line area 32 of the exhaust gas/reactant heat exchanger unit 26. The temperature sensor 42 may also be positioned in this area upstream in relation to the reactant injection unit 20 and downstream in relation to the heating unit 24, which also comprises an electrically operable heater 28 again in this exemplary embodiment.

The exhaust gas/reactant heat exchanger unit 26 may have the embodiments described above with reference to FIGS. 1 through 6 in this embodiment as well. The essential difference is that the coupling area to the reactant injection unit 20 is located in the interior 30 of the exhaust gas-carrying pipe 12. This in turn causes that the heater 28 is advantageously located upstream in relation to the exhaust gas/reactant heat exchanger unit 26 and hence outside the exhaust gas-carrying pipe 12.

Figure 10:
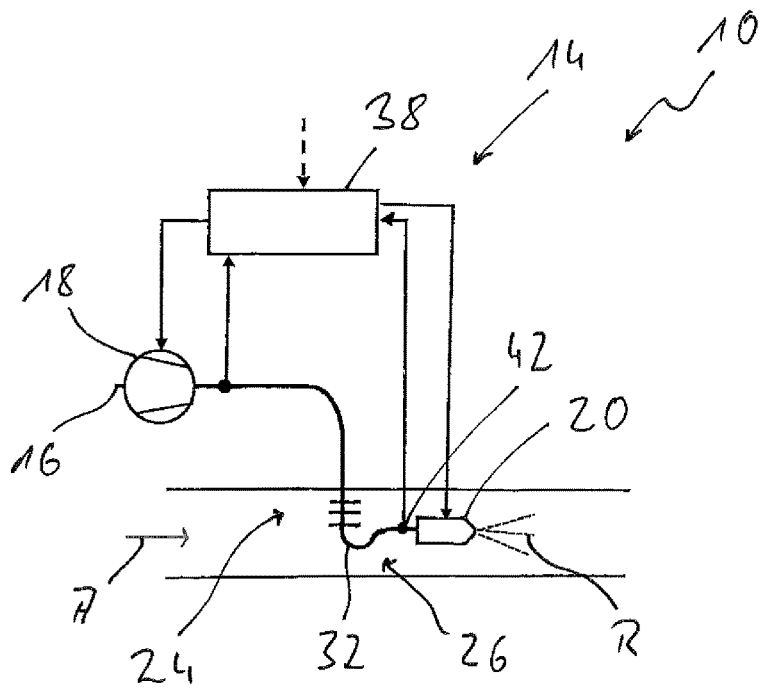
FIG. 10 is a view corresponding to FIG. 1 of an alternative embodiment of an exhaust system.

FIG. 10 shows a variant of the exhaust system shown in FIG. 9. The exhaust system according to FIG. 10 comprises a heating unit 24, which in turn comprises only the exhaust gas/reactant heat exchanger unit 26 but no electrically operable heater. The heat is thus introduced exclusively by thermal interaction with the exhaust gas A flowing in the exhaust gas-carrying pipe 12, and it is possible, by detecting the temperature of the reactant R and the pressure of the reactant R by means of the sensors 42, 40, to actuate the reactant delivery unit 18 such that the reactant pressure is preferably above the respective vapor pressure associated with the reactant temperature by a predefined pressure difference.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine, the exhaust system comprising:
an exhaust gas-carrying pipe;
a reactant release unit releasing reactant into exhaust gas flowing in the exhaust gas-carrying pipe, the reactant release unit comprising:
a reactant injection unit;
a reactant delivery unit delivering reactant from a reactant reservoir to the reactant injection unit; and
a heating unit provided in a flow path of the reactant between the reactant delivery unit and the reactant injection unit and heating reactant being delivered to the reactant injection unit, the heating unit comprising an exhaust gas/reactant heat exchanger unit transferring heat, being transported in the exhaust gas, to the reactant, the heating unit further comprising an electrically operable heater downstream in relation to the exhaust gas/reactant heat exchanger unit;
an actuating unit configured to actuate the reactant delivery unit, the electrically operable heater and the reactant release unit;
at least one reactant pressure sensor provided in the flow path of the reactant between the exhaust gas/reactant heat exchanger unit and the electrically operable heater, wherein the actuating unit is configured to actuate the reactant delivery unit based on a reactant pressure detected by the reactant pressure sensor;
at least one reactant temperature sensor provided in the flow path of the reactant between the heating unit and the reactant injection unit, wherein the actuating unit is configured to actuate the reactant delivery unit based on a reactant temperature detected by the reactant temperature sensor, wherein the exhaust gas/reactant heat exchanger unit comprises a heat exchanger line area in a reactant line sending reactant to the reactant injection unit, the heat exchanger line area extending, in at least some sections, outside the exhaust gas-carrying pipe and in contact with an outer surface of the exhaust gas-carrying pipe;
insulating material embedding the heat exchange line area, wherein the exhaust gas-carrying pipe is surrounded by the insulating material at least in a length area interacting with the heat exchanger line area.

2. The exhaust system in accordance with claim 1, wherein the heat exchanger line area extends helically with respect to the exhaust gas-carrying pipe or meanders with respect to the exhaust gas-carrying pipe or both extends helically with respect to the exhaust gas-carrying pipe or meanders with respect to the exhaust gas-carrying pipe.

3. The exhaust system in accordance with claim 1, wherein the reactant delivery unit is arranged upstream of the heating unit in a direction of flow of the reactant.

4. The exhaust system in accordance with claim 1, wherein the actuating unit is configured to actuate the electrically operable heating unit or the reactant release unit or any combination of the electrically operable heating unit and the reactant release unit based on the reactant pressure detected by the reactant pressure sensor; or
wherein the actuating unit is configured to actuate the electrically operable heating unit or the reactant release unit or any combination of the electrically operable heating unit and the reactant release unit based on the reactant temperature detected by the reactant temperature sensor.

5. A method for operating an exhaust system, the method comprising the steps of:
providing the exhaust system comprising:
an exhaust gas-carrying pipe;
a reactant release unit releasing reactant into exhaust gas flowing in the exhaust gas-carrying pipe, the reactant release unit comprising:
a reactant injection unit;
a reactant delivery unit delivering reactant from a reactant reservoir to the reactant injection unit; and
a heating unit provided in a flow path of the reactant between the reactant delivery unit and the reactant injection unit and heating reactant being delivered to the reactant injection unit, the heating unit comprising an exhaust gas/reactant heat exchanger unit transferring heat, being transported in the exhaust gas, to the reactant, the heating unit further comprising an electrically operable heater downstream in relation to the exhaust gas/reactant heat exchanger unit;
an actuating unit configured to actuate the reactant delivery unit, the electrically operable heater and the reactant release unit;
at least one reactant pressure sensor provided in the flow path of the reactant between the exhaust gas/reactant heat exchanger unit and the electrically operable heater, wherein the actuating unit is configured to actuate the reactant delivery unit based on a reactant pressure detected by the reactant pressure sensor;
at least one reactant temperature sensor provided in the flow path of the reactant between the heating unit and the reactant injection unit, wherein the actuating unit is configured to actuate the reactant delivery unit based on a reactant temperature detected by the reactant temperature sensor, wherein the exhaust gas/reactant heat exchanger unit comprises a heat exchanger line area in a reactant line sending reactant to the reactant injection unit, the heat exchanger line area extending, in at least some sections, outside the exhaust gas-carrying pipe and in contact with an outer surface of the exhaust gas-carrying pipe;
insulating material embedding the heat exchange line area, wherein the exhaust gas-carrying pipe is surrounded by the insulating material at least in a length area interacting with the heat exchanger line area
delivering reactant from a reactant reservoir to the reactant injection unit; and
heating reactant being delivered to the reactant injection unit by transferring heat, being transported in the exhaust gas, with the heat exchanger unit, to the reactant, wherein the actuating unit actuates the reactant delivery unit such that the reactant pressure is above the vapor pressure of the reactant heated by the heating unit.

6. The method in accordance with claim 5, wherein the actuating unit actuates the electrically operable heater such that the reactant heated by the heater is brought into a superheated state, such that the reactant temperature is in the range of a desired superheated temperature.

7. An exhaust system for an internal combustion engine, the exhaust system comprising:
an exhaust gas-carrying pipe;
a reactant release unit releasing reactant into exhaust gas flowing in the exhaust gas-carrying pipe, the reactant release unit comprising:

a reactant injection unit;

a reactant delivery unit;

a reactant delivery flow path, wherein the reactant is delivered from a reactant reservoir to the reactant injection unit via the reactant delivery flow path; and a heating unit provided in the reactant delivery flow path of the reactant between the reactant delivery unit and the reactant injection unit, the heating unit being configured to heat the reactant being delivered to the reactant injection unit, the heating unit comprising an exhaust gas/reactant heat exchanger unit transferring heat, being transported in the exhaust gas, to the reactant, the heating unit further comprising an electrically operable heater downstream of the exhaust gas/reactant heat exchanger unit relative to a flow of the reactant;

an actuating unit configured to actuate the reactant delivery unit, the electrically operable heater and the reactant release unit;

at least one reactant pressure sensor, at least a portion of the reactant delivery flow path being arranged between the exhaust/gas reactant heat exchanger unit and the electrically operable heater, at least a portion of the at least one reactant pressure sensor being arranged in the portion of reactant delivery flow path, wherein the actuating unit is configured to actuate the reactant delivery unit based on a reactant pressure detected by the reactant pressure sensor;

at least one reactant temperature sensor provided in the reactant delivery flow path between the heating unit and the reactant injection unit, wherein the actuating unit is configured to actuate the reactant delivery unit based on a reactant temperature detected by the reactant temperature sensor, wherein the exhaust gas/reactant heat exchanger unit comprises a heat exchanger line area in a reactant line sending reactant to the reactant injection unit, the heat exchanger line area extending, in at least some sections, outside the exhaust gas-carrying pipe and in contact with an outer surface of the exhaust gas-carrying pipe;

insulating material embedding the heat exchange line area, wherein the exhaust gas-carrying pipe is surrounded by the insulating material at least in a length area interacting with the heat exchanger line area.

8. The exhaust system in accordance with claim 7, wherein an extent of the portion of the reactant delivery flow path extends from an outer surface of the exhaust gas-carrying pipe to an inlet of the electrically operable heater, the portion of the at least one reactant pressure sensor being arranged in the extent of the portion of the reactant delivery flow path.

9. The exhaust system in accordance with claim 7, wherein the at least one reactant pressure sensor is configured to detect the reactant pressure in the portion of the reactant delivery flow path arranged between the exhaust/gas reactant heat exchanger unit and the electrically operable heater.

* * * * *